(12) United States Patent
Neill et al.

(10) Patent No.: US 8,423,765 B2
(45) Date of Patent: *Apr. 16, 2013

(54) SYSTEM AND METHOD FOR REMOTE DEVICE REGISTRATION

(75) Inventors: Brian Neill, Burlington (CA); Ashok Vadekar, Rockwood (CA); Patrick Xu, Richmond Hill (CA)

(73) Assignee: Certicom Corp., Mississauga (CA)

( * ) Notice: Subject to any disclaimer, the term of this patent is extended or adjusted under 35 U.S.C. 154(b) by 422 days.

This patent is subject to a terminal disclaimer.

(21) Appl. No.: 12/767,957

(22) Filed: Apr. 27, 2010

(65) Prior Publication Data

US 2010/0205433 A1      Aug. 12, 2010

Related U.S. Application Data

(63) Continuation of application No. 11/450,418, filed on Jun. 12, 2006, now Pat. No. 7,734,915.

(60) Provisional application No. 60/690,155, filed on Jun. 14, 2005, provisional application No. 60/777,262, filed on Feb. 28, 2006.

(30) Foreign Application Priority Data

Jun. 21, 2005 (CA) ..................................... 2510366
Feb. 28, 2006 (CA) ..................................... 2538087

(51) Int. Cl.
*H04L 29/06* (2006.01)
(52) U.S. Cl.
USPC ............................ 713/165; 713/164; 713/150
(58) Field of Classification Search .......................... None
See application file for complete search history.

(56) References Cited

U.S. PATENT DOCUMENTS

| 4,652,992 A | 3/1987 | Mensch, Jr. |
| 6,925,562 B2 | 8/2005 | Gulcu et al. |

(Continued)

FOREIGN PATENT DOCUMENTS

| CN | 1198278 A | 7/1998 |
| JP | 2002353084 A2 | 6/2002 |

(Continued)

OTHER PUBLICATIONS

Merrit, Rick; "Crypto Model Plugs Leaky Fabs"; EE Times Online; Jul. 24, 2006 available at http://www.eetimes.com/news/latest/showArticle.jhtml?articleID=190900759.

(Continued)

*Primary Examiner* — Pramila Parthasarathy
(74) *Attorney, Agent, or Firm* — Brett J. Slaney; John R. S. Orange; Blake, Cassels & Graydon LLP

(57) ABSTRACT

A system and method for remote device registration, to monitor and meter the injection of keying or other confidential information onto a device, is provided. A producer who utilizes one or more separate manufacturers, operates a remote module that communicates over forward and backward channels with a local module at the manufacturer. Encrypted data transmissions are sent by producer to the manufacturer and are decrypted to obtain sensitive data used in the devices. As data transmissions are decrypted, credits from a credit pool are depleted and can be replenished by the producer through credit instructions. As distribution images are decrypted, usage records are created and eventually concatenated, and sent as usage reports back to the producer, to enable the producer to monitor and meter production at the manufacturer.

36 Claims, 13 Drawing Sheets

U.S. PATENT DOCUMENTS

| | | | |
|---|---|---|---|
| 7,391,868 B2 | 6/2008 | Qu et al. | |
| 7,730,304 B2 * | 6/2010 | Katsube et al. | 713/168 |
| 7,734,915 B2 * | 6/2010 | Neill et al. | 713/165 |
| 2002/0010679 A1 | 1/2002 | Felsher | |
| 2002/0016838 A1 | 2/2002 | Geluc et al. | |
| 2002/0023217 A1 | 2/2002 | Wheeler et al. | |
| 2003/0002680 A1 | 1/2003 | Akiyama et al. | |
| 2003/0021421 A1 | 1/2003 | Yokota et al. | |
| 2003/0182435 A1 | 9/2003 | Redlich et al. | |
| 2005/0021962 A1 | 1/2005 | Benedikt | |
| 2005/0131900 A1 | 6/2005 | Palliyll et al. | |
| 2005/0138374 A1 | 6/2005 | Zheng et al. | |
| 2006/0101288 A1 | 5/2006 | Smeets et al. | |
| 2006/0155990 A1 | 7/2006 | Katsube et al. | |
| 2006/0177061 A1 | 8/2006 | Orsini et al. | |
| 2006/0242385 A1 | 10/2006 | Murakami et al. | |
| 2007/0098179 A1 | 5/2007 | Nave | |

FOREIGN PATENT DOCUMENTS

| | | |
|---|---|---|
| JP | 2003-134101 A | 5/2003 |
| JP | 2004-220682 A | 8/2004 |
| JP | 2004-304600 A | 10/2004 |
| JP | 2005-038411 A | 2/2005 |
| JP | 2005-294952 A | 10/2005 |
| JP | 2006-505041 A | 2/2006 |
| JP | 2008-506338 A | 2/2008 |
| JP | 2008-507203 A | 3/2008 |
| JP | 2008-507205 A | 3/2008 |
| WO | WO 2004/040397 A2 | 5/2004 |
| WO | WO 2006/133545 A1 | 12/2006 |

OTHER PUBLICATIONS

Maxfield, Clive; "Embedding Security in your Designs"; Chip Design Magazine; Aug./Sep. 2006 Issue available at http://www.chipdesignmag.com/display.php?articleId=538&issueId=18.

Levin et al.; "Crossroads for Mixed-Signal Chips"; IEEE Spectrum Magazine, Mar. 2002; pp. 38-43, vol. 39, Issue 3.

Orser, Jeffrey; International Search Report from PCT/CA2007/000310; search completed Jun. 18, 2007.

Saifuddin, Saadia; International Search Report from PCT/CA2006/000944; search completed Nov. 9, 2006.

Veen, Gerardus; Supplementary Search Report from European Application No. 07710656.5; search completed Nov. 10, 2010.

Veen, Gerardus; Supplementary Search Report from European Application No. 06752780.4; search completed Nov. 9, 2010.

* cited by examiner

SYSTEM AND METHOD FOR REMOTE DEVICE REGISTRATION

CROSS-REFERENCE TO RELATED APPLICATIONS

This application is a continuation of U.S. patent application Ser. No. 11/450,418 filed on Jun. 12, 2006, and claims priority from U.S. Provisional Application No. 60/690,155 filed on Jun. 14, 2005, Canadian Patent Application No. 2,510,366 filed on Jun. 21, 2005, U.S. Provisional Application No. 60/777,262 filed on Feb. 28, 2006 and Canadian Patent Application No. 2,538,087 filed on Feb. 28, 2006, all of which are incorporated herein by reference.

FIELD OF THE INVENTION

The present invention relates generally to the manufacture of devices having sensitive data therein, and particularly to remotely controlling and monitoring the injection of such sensitive data into such devices.

DESCRIPTION OF THE PRIOR ART

A device that participates in a cryptographically secure communication system, will typically have some type of unique and immutable information that was injected into the device at the time of manufacturing. This information could be a cryptographic key, a shared secret or some other data that may be cryptographically bound to an inherently unique attribute of the device. Such information may be generally referred to as a "key", and the injection of information may be generally referred to as "keying" the device or "key injection".

The purpose of injecting the keys is to ensure that the device is accepted as an authentic participant of a secured communication system at some point in the future, after the device has been distributed. However, the producer of the device will often wish to ensure that devices are manufactured legitimately and thus wishes to protect the keys that are injected into the devices. The producer will typically aim to protect the keys in order to protect future revenue, since authentication of the keys may be used to provide conditional access to the secure system and its content etc. The injected key is also important as it enables a customer or user of the device to avoid tedious procedures required to register the device.

The device may be granted such conditional access to the system based on cryptographic authentication that the key is trusted. This trust is based on the fact that it is exceptionally difficult to reproduce the trusted data outside of the manufacturing process. Systems that provide conditional access include, e.g., satellite television and radio, those systems that continuously broadcast information but wish to control access to their content and thus revenue for providing such content. These systems rely on the manufacturing process and the Original Equipment Manufacturer (OEM), in particular, key injection, to provide a root of trust for the devices, and ultimately for the entire secure communication system.

Keys that are injected into the devices are sometimes of a standard format and purchased from a governing body, for example, High Definition Content Protection (HDCP) keys, which are used to protect data as it is sent over a cable from your PC to your monitor among other things. The governing body thus also has an interest in ensuring that the keys distributed to the device's producer are protected and not lost. This creates a liability for the producer, thus increasing the importance for protecting the injected keys. In some cases, the producer can be fined for losing or copying keys and if they acquire a reputation for negligence when handling keys, the governing body may restrict or sever the distribution of the keys. Maintaining this relationship is often important to the producer, especially when the keys are of a standard format needed for the device to be compatible with other devices and/or infrastructure. In this case, without being able to use a particular key, the device will not work as intended.

In a modern business climate comprising ever-increasing device complexity and sophistication, it is common for individual parts to be manufactured and keyed by one manufacturer for later assembly by another manufacturer. In such a situation there exists certain security implications when the producer of the device or the owner of the communication system is not the device manufacturer. It can therefore be paramount for a device producer to ensure the integrity of the manufacturing systems that are responsible for the integrity of the producer's device.

When considering the integrity of the manufacturing process, of particular concern are issues related to the confidentiality of secret information that is used to manufacture the device, as well as ensuring that the manufacturer correctly reports the identities and the number of units manufactured to the producer. Ideally, the producer of the device should try to obtain assurances that a manufacturer is not creating and distributing "grey" or "black" market parts or devices. For example, a manufacturer that ships a certain number of keyed products back to the producer, but still has leftover keys, may then manufacture and sell devices with those extra keys. The producer has thus lost revenue since the manufacturer is the one who profits from the sale. Other actions such as cloning or theft of keys may also arise, which is difficult to detect and control when the keying process is outsourced. In some cases, keys could be published on the Internet to enable users to gain access to a conditional access system without paying for such a service.

Traditionally, a producer that is concerned about securing the information injection stage at a manufacturing site has little choice but to implicitly trust that a manufacturer is operating in a manner that gives due consideration to the producer's device and system security. Protective mechanisms are generally naïve, in that keying information is typically bulk encrypted and sent to the manufacturer, where, upon arrival, all of the keying information is decrypted at once, and the manufacturer is then trusted not to compromise the bulk of information.

One method to restrict access to keying information is to use an on-line client-server mechanism. With such a mechanism in place, the client at the manufacturer's facility would be connected to a network, and would make requests for keying information on a per-device basis, to a remote key-providing server under the control of the producer.

There are a number of problems with implementing a manufacturing system that relies on an off-site, remotely networked server, that provides keying information on such a just-in-time basis. The foremost problem is that an off-site server can not guarantee a minimal service level or response time to the manufacturing line if it uses a public shared packet-switched network. To prevent problems in the manufacturing line, a certain level of service in terms of latency and through-put is optimal. Given modern manufacturing realities, where production lines exist in remote jurisdictions relative to the producer, such guaranteed network availability can be prohibitively expensive.

A manufacturing facility will typically not begin a production run without all of the necessary materials on hand, including data materials. Otherwise, the risk to production line delays would be too high. Any keying system used by a manufacturer, should be able to substantially guarantee service availability and provide a suitable response. This requires local availability of all data resources and keying information before commencement of a production run.

Given that all data resources must be locally available to a production line, possibly existing on computer systems, and media that is not under direct control of the producer; the producer must consider how to ensure the confidentiality of any secret keying information.

Enough data should be locally available to the manufacturer, in order to commence and complete a production run. In the event that the producer discovers unauthorised and contractually objectionable behaviour by the manufacturer, the producer should also consider how to prevent such a rogue manufacturer from producing grey or black market product, after the termination of a contract.

Another problem related to cloning stems from overproduction, a specific type of cloning operation, which is of particular concern to producers of silicon chips. Overproduction can occur when the producer of an integrated circuit (IC) outsources manufacturing of their IC designs to one or more third party manufacturing companies. The purpose of outsourcing certain or all manufacturing steps is to lower production costs by selecting a third party that can offer the best price for performing a particular stage in the manufacturing process. For example, a fabless design house (e.g. a producer) may wish to contract overseas manufacturing facilities to build chips that they have designed. Such overseas manufacturing facilities are often chosen as they are able to produce electronic components relatively inexpensively.

However, outsourcing generally increases the risk that a particular contractor may overproduce product, that they have been contracted to build, in order to supply a grey market. For example, if the contracted manufacturer acts in bad faith and over produces ICs from the design provided by the producer, but does not inform the producer that such overproduction occurs, the extra product is available to be sold in a grey market channel as "counterfeit" or "cloned" ICs. This allows the third party manufacturers to realize extra revenues and earnings at the expense of future product demand and revenues for their customer, namely the producer/designer.

The above may occur because, in such scenarios, often the producer does not ever handle the product aside from receiving engineering samples at the beginning of the production phase. Accordingly, at each stage of the manufacturing process, subsequent to design, there is an opportunity to steal parts and product. In some cases, employees of a good faith contract manufacturer may be thieves. "Yield shrinkage" may occur, where an employee steals product right off of the manufacturing line. This can be detrimental to not only the producer and contract manufacturer, due to lost revenue, but also to the relationship between the producer and the manufacturer for conducting future business.

It is therefore an object of the present invention, to obviate or mitigate the above-described disadvantages.

SUMMARY OF THE INVENTION

The present invention provides a system and method that enables a producer who wishes to use a separate entity for at least a portion of the manufacturing process, to monitor and protect production of devices from a remote location.

The present invention also provides a means for separating the addition of sensitive data to a product between separate entities for inhibiting grey market product due to overproduction and yield shrinkage.

In one aspect, the present invention provides a method for remotely controlling the injection of sensitive data into a device during production thereof. The method comprises the steps of a controller preparing and cryptographically protecting the sensitive data in a data transmission; the controller sending the data transmission to a server, the server having a secure module for performing cryptographic operations; the secure module extracting the sensitive data from the data transmission; and the server providing the sensitive data to equipment for injection into the device; wherein the controller is located remote from the server.

In another aspect, the present invention provides a system for remotely controlling the injection of sensitive data into a device during production thereof. The system comprises a controller having a first secure module for performing cryptographic operations; a server located remote from the controller and connected thereto by a forward channel and a back channel, the forward channel used by the controller for providing a data transmission to a second secure module of the server, the data transmission cryptographically protecting the sensitive data, the second secure module extracting the data from the transmission; and an agent operating with equipment used for injecting the data upon extraction from the transmission, the agent obtaining the data from the second secure module.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
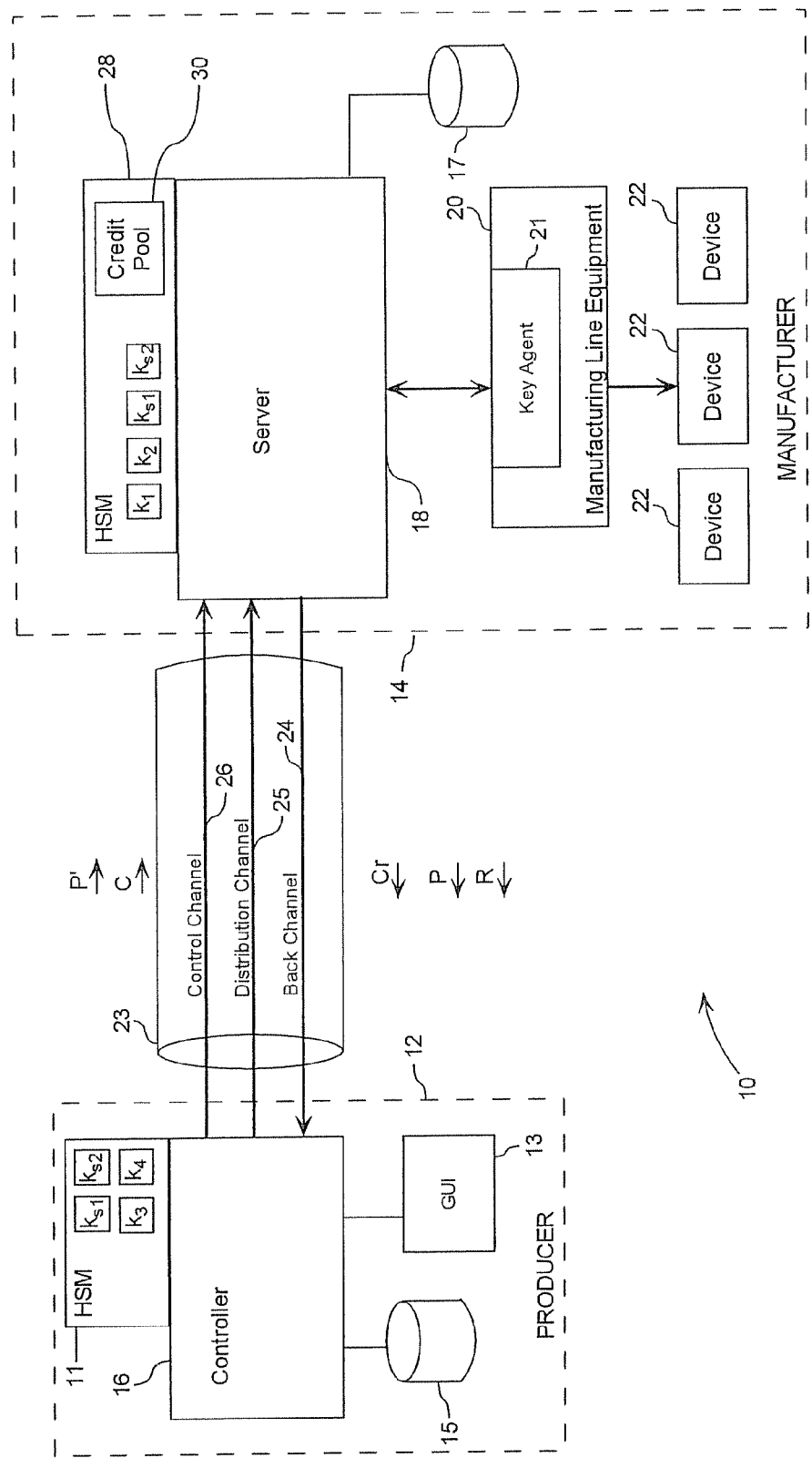
FIG. 1 is a schematic block diagram of a remote device registration system.

Referring to FIG. 1, a remote device registration or trusted key injection system is generally denoted by numeral 10. A producer 12 of a device 22 utilizes the services of a separate entity, in this case an outside manufacturer 14, for the injection of unique and immutable information into the devices 22. The information may be a cryptographic key, a shared secret, or some other data that may be cryptographically bound to an inherently unique attribute of the device 22 and will hereinafter be referred to as a "key". The step of injecting the key into a device 22 will hereinafter be referred to as "keying" or "key injection".

The producer 12 utilizes a controller 16, which is a computer system that is remote to the manufacturer's facility. The controller 16 includes a hardware security module (HSM) 11. The HSM 11 is a protected device used by the controller 16 to perform cryptographically secure operations, such as encryption, decryption and signing. The HSM 11 may be tamper resistant (e.g. physically difficult to access) or may be tamper reactive (e.g. erases data if tampered with). The controller 16 is responsible for packaging and conveying keys and other information to the manufacturer 14 as well as for monitoring the distribution and usage of the keys by the manufacturer 14. The producer 12 typically obtains bulk quantities of keys (not shown) from an outside source such as a governing body, e.g. producer of HDCP keys. The keys are stored in a data storage device 15 until they are to be distributed to a particular manufacturer 14. The controller 12 and its operations can be monitored, modified and thus controlled by an operator using a graphical user interface (GUI) 13. The GUI 13 is typically a software application that is displayed and interacted with using a personal computer (not shown).

The controller 16 is connected to a server 18 residing at the manufacturer 14 through a pipeline 23. The pipeline 23 includes two forward communication channels, namely a control channel 26 and a distribution channel 25, and a backward channel 24. The control channel 26 is used by the controller 16 to meter the number of keys that the manufacturer 14 may use by sending credit instructions. The distribution channel 25 is used by the controller 16 to distribute protected blocks of keys to the manufacturer 14. The back channel 24 is used by the system 10 to make the controller 16 aware of key usage for reporting and auditing purposes. The channels 24, 25 and 26 may be arbitrary communication channels and are not required to be either reliable or secure. Reliability and security over the channels 24, 25 and 26 are provided using a combination of technical mechanisms and processes/procedures. For example, if a message sent over the forward channel 26 to the module 18 does not decrypt because it is corrupt, a user may phone an operator of the system controller module 16, and have them send the message again.

The manufacturer 14 utilizes one or more server 18, which is a computer system that is local to the manufacturer's facility and whose activities are monitored and metered through messages sent by the controller 16. The server 18 also reports back to the controller 16 over the back channel 24. The server 18 includes an HSM 28 that is similar to the HSM 11 utilized by the controller 16. The HSM 28 stores a protected credit pool 30 which dictates how many keys the manufacturer 14 may use. Use of the keys is metered by the controller 16 by monitoring data reported by the server 18, and adding or subtracting from the credit pool 30 accordingly. The credit pool 30 is an abstract concept representing the number of keys that may be decrypted by the HSM 28 before the server 18 must request and obtain more keys from the controller 16. The controller 16 distributes keys to the server 18 over the distribution channel 25, and the server 18 will store the keys in a local data storage device 17 as will be explained more fully below.

The manufacturer 14 utilizes one or more equipment 20 used to inject the cryptographic keys into the devices 22. Typically keying occurs during a testing phase of the manufacturing process, and thus the equipment 20 is often a testing machine on an assembly line. The equipment 20 includes a key agent 21 which is typically a software program or toolkit that is loaded into the equipment 20 used to administer key injection at the application side. The key agent 21 communicates with the server 18 to request and obtain keys as they are needed. Typically, the server 18 will provide enough keys to the key agent 21 so as to not disrupt the timing of the production process. However, the server 18 will not provide an unnecessary number of keys so as to restrict the usage of the keys until keying approval is provided by the controller 16 as metered through the credit pool 30.

Typically, the key agent 21 will have threshold levels that indicate when a new batch of keys are needed by that particular equipment 20, so as to not disrupt production. Since the controller 16 is typically not in constant communication with the server 18, the controller 16 may adjust its parameters to ensure that enough keying material is made available to the equipment 20 through the server 18, while ensuring that not too much key data is released by the server 18, before the controller 16 can obtain key usage reports from the server 18 as will be explained in greater detail below.

The key agent 21 will preferably include an application program interface (API) that runs on the equipment 20 to enable an operator of the equipment itself to request keys, either manually or in an automated fashion. The key agent 21 is used to provide a level of protection for data passing between the server 18 and the equipment, and may be thought of as a simplified secure sockets layer (SSL) connection between the server 18 and equipment 20. It will be appreciated that resources permitting, the key agent 21 may also be implemented using an SSL connection between itself and the server 18. The key agent 21 is also responsible for generating report records as keys are used, that are sent back to the server 18 for reporting purposes.

Figure 2:
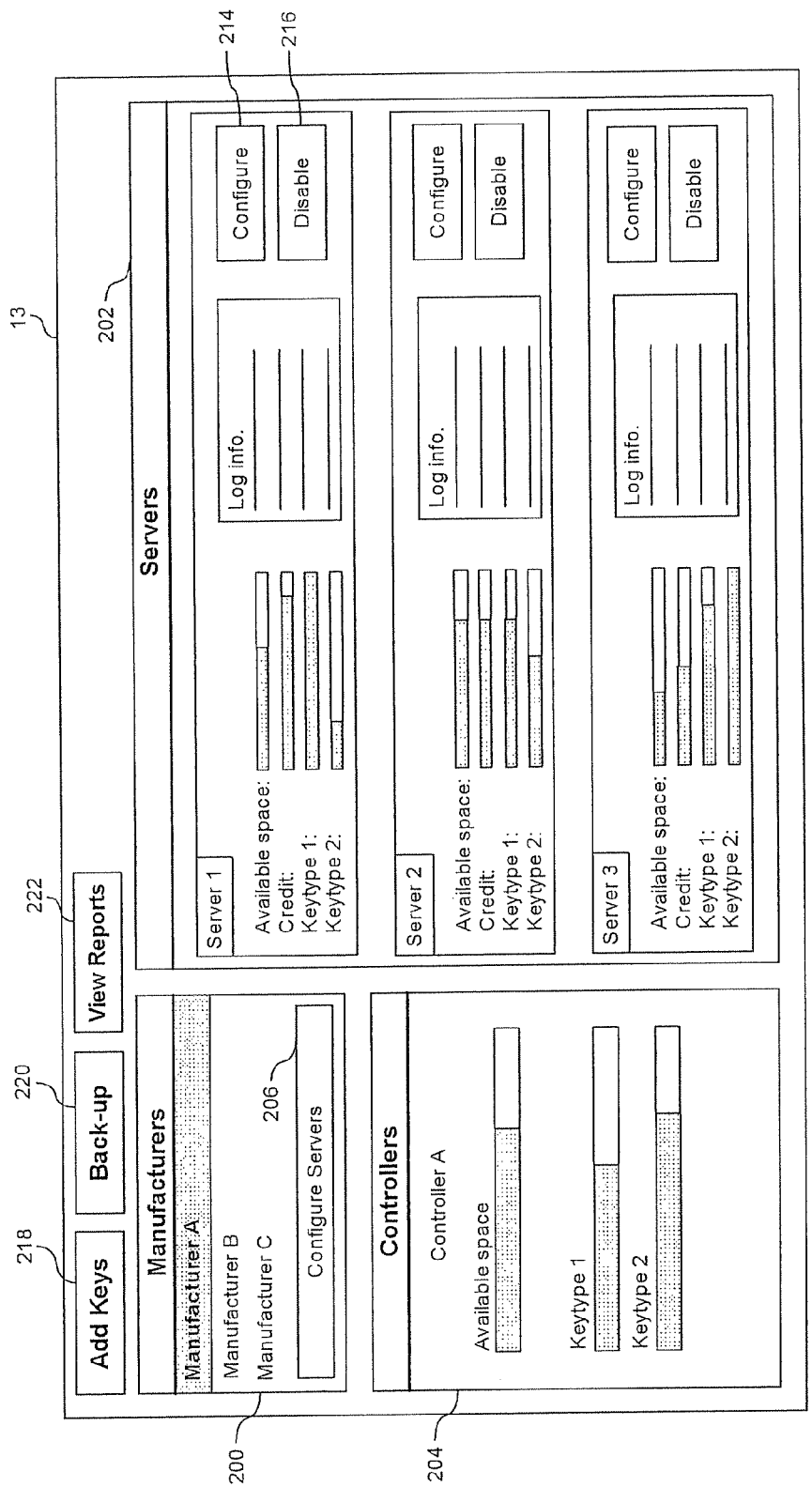
FIG. 2 is a schematic representation of the graphical user interface (GUI) illustrated in FIG. 1.

The controller 16 is the command center for monitoring and metering key injection by the manufacturer 14. In order to control keying from a remote location, the GUI 13 is used by an operator to monitor and configure each manufacturer 14, server 18, and equipment 20 that is under the control of the controller 16. An example GUI 13 is shown in FIG. 2. The GUI 13 is divided into a server window 200, a controller window 204 and an equipment window 202. The server window 200 includes a list of the manufacturers 14 and thus the servers 18 that are controlled by the controller 16. The particular controller 16 is indicated in the controller window 204. The operator can select a particular manufacturer (e.g. manufacturer A as shown in FIG. 2), and the equipment 20 that is associated with the manufacturer is displayed in the equipment window 202.

In the example shown in FIG. 2, the server at manufacturer A comprises a window offering information regarding server 1, server 2 and server 3. Each server has certain data associated with it. For instance, as shown in FIG. 2, each server includes a progress bar showing their available storage space, available credit and number of keys available for each of keytype 1 and keytype 2. Each tester window also displays log information, such as dates on which previous reports were processed, previously reported credit, previous refill amount, and data regarding missing log records. The server windows also provide the operator with options 214 and 216 for remotely configuring and disabling the server 18 from the controller 16.

The controller 16 has the capability of remotely configuring the servers 18. This allows the controller 16 to change key types, add or delete key types and control other configuration options. This is preferably accomplished by sending configuration messages, along the control channel 26, to the server HSM 28. The HSM 28 may evaluate the configuration messages, whereby some configuration messages alter the behaviour of the HSM 28, and other configuration messages are sent to the server 18. Configuration messages sent to the server 18 via the HSM 28, using this method, can help to ensure that the server 18 attains configuration instructions that are trusted and known to originate from the controller 16.

The controller 16 may remotely configure the system 10 at the server level or the equipment level through the key agent 21. The controller 16 can also force polls of the servers 18 and can adjust the intervals for regular polling. Typically, the servers 18 are polled at a fixed interval, and the controller 16 can use a forced poll to obtain information between the intervals as needed. For example, with a one day interval, the controller 16 may need data to report to an administrator intraday, and thus can force a poll of all servers to obtain such data. The GUI 13 may also include a controller email option allowing the controller 16 to automatically contact an administrator in extreme circumstances, such as decryption or distribution failure at critical production runs.

Figure 8:
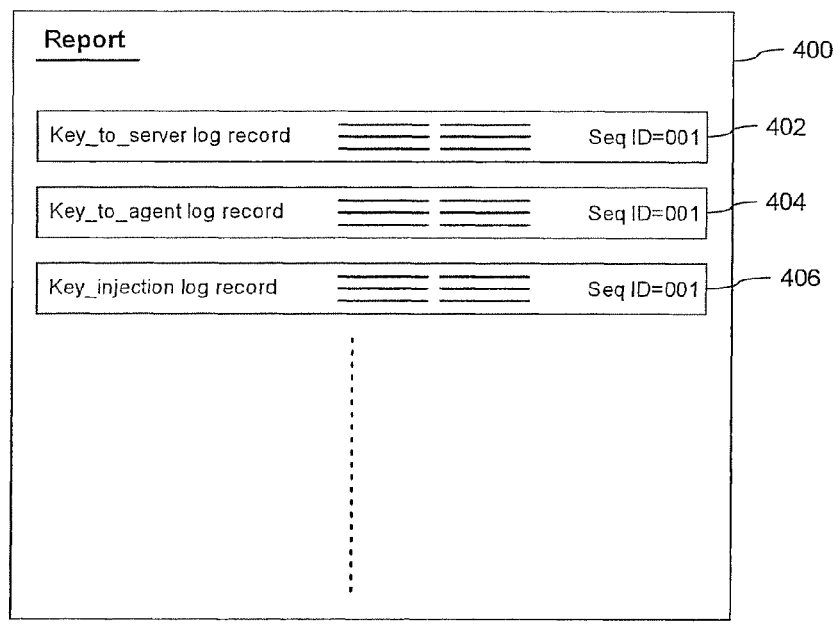
FIG. 8 illustrates an example of a filtered log report.

Each key that is distributed to the server 18 and injected by equipment 20 into device 22 triggers certain log records at certain events. The GUI 13 can be used to search, sort, compile and analyze the log records and to view a custom or standard report 400 as shown in FIG. 8. In this example, there are three primary log records that are generated. A key to server log 402 is generated when a key is distributed by the producer 16 to a server 18, a key to agent log 404 is generated by the HSM 28 at the point where it releases a key to the key agent 21, and a key injection log 406 will be generated by the key agent 21 upon injection of the key. Each log record may include any number of identifying information, including ID types, time stamps, manufacturer, equipment etc. In the example report shown in FIG. 8 the report 400 illustrates a key to server log 402, key to agent log 404 and key injection log 406 for a key having a sequence ID=001. These records may then be used to track the life cycle of the key having such a sequence ID number. It will be appreciated that the report 400 may include any number of records and may be filtered based on any suitable field. For example, a report 400 showing all keys injected on May 3$^{rd}$ by tester 2 at manufacturer A could be compiled by filtering accordingly, a date field and a location field.

Figure 3:
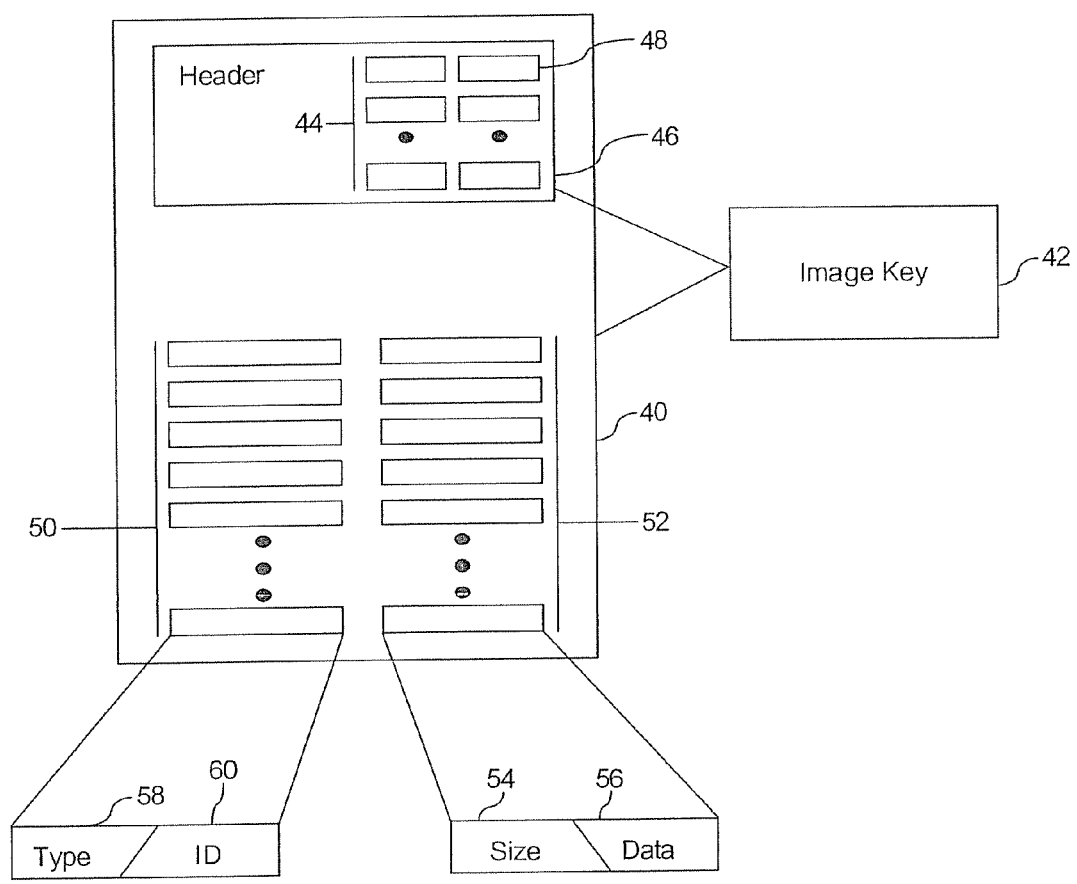
FIG. 3 is a schematic representation of a distribution image.

Referring now to FIG. 3, the controller 16 may package a bulk set of keys in a secure data transmission using a distribution image 40 that is to be sent to the server 18, preferably using encryption. The distribution image 40 enables the producer to include keys for multiple products destined for multiple servers 18 in one transmission. Each server 18 is then able to decrypt and obtain a certain number of keys, but only after authorization has been received by the HSM 28, from the controller 16 via the control channel 26. The image 40 is a collection of data records, each record contains a type 58, ID 60, size 54 and data 56 field.

Where data 56 will typically contain the key data of an arbitrary size identified by size 54. Type 58 and ID 60 fields are used by the HSM 28 to identify the key data, possibly being used to filter certain keys, depending on the HSM's 28 configuration, as previously instructed via the control channel 26. Keys may be encapsulated such that the implementation does not care what a key really looks like to the target. This makes it flexible and extensible without requiring a redesign for each new key type. The wrapper should contain a type, size and unique ID, the body is abstract. The wrapper may also contain elements to support more advanced features like logging or variable assignment into the abstracted image.

The image 40 is encrypted with an image key 42. The image key 42 is used by the server 18 to decrypt the image 40 and obtain the keys. The image key 42 is itself encrypted for each server 18 and stored as a server header 48. A collection 44 of server headers 48 are stored in a main header 46. To decrypt the image 40 and obtain the keys, the header 48 is chosen by the server 18 and is decrypted by the HSM 28 to obtain the image key 42. The image key 42 is then used to decrypt the image 40.

Figure 7:
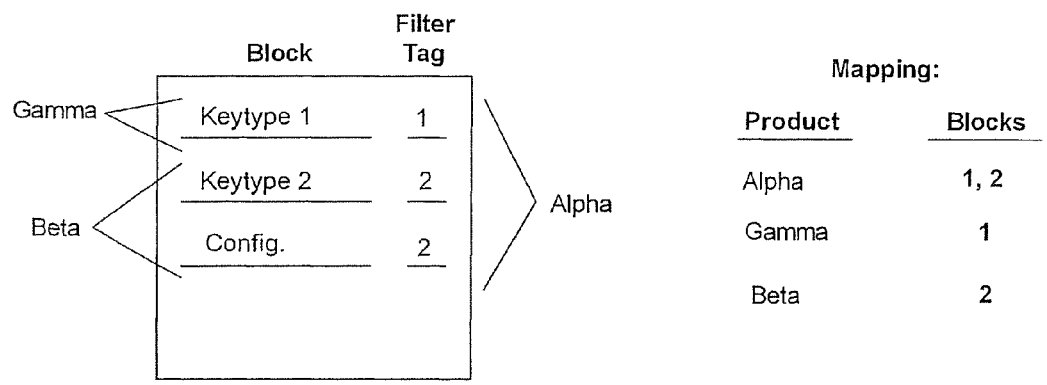
FIG. 7 illustrates a mapping scheme for another embodiment supporting multiple products.

As noted earlier, the distribution images 40 may be used to support multiple products. Referring also to FIG. 7 a mapping of product types and data blocks is shown. For example, the producer 16 has three products, namely gamma utilizing key 1 (having filter tag 1), beta utilizing key 2 (having filter tag 2) and an accompanying configuration block (also having filter tag 2), and alpha utilizing key 1, key 2 and the configuration block. The image 40 may include bulk quantities of keytype 1 and keytype 2, and the gamma and beta products may be less sophisticated than the alpha product. Producer 16 can package a single image 40 with data for, e.g. fifty (50) of each block, whereby a certain tester (e.g. tester 1) has permission to manufacture, and thus may obtain fifty (50) of filter tags 1 and 2 for producing fifty of product alpha. Another tester (e.g. tester 2) may at the same time have permission to manufacture and thus obtain fifty (50) of filter tag 1 from the image 40, to produce fifty of product beta, and fifty (50) of filter tag 2 to produce product gamma. An image 40 may contain all of the keying data, possibly including multiple type of keys, to produce a single product of any product type. A tester identifies to the server 18 the type of product, or product model, that it is being programmed. This model information is sent to the HSM 28 with the encrypted image 40, so that when the HSM 28 decrypts the image 40, the key data 50, can be filtered and only the key data needed to program the identified product model is ever release by the HSM 28 to the tester. Therefore, the producer 12 can support multiple products with a single image 40 whilst taking steps to ensure that the manufacturer 14 can only manufacture the products that they are supposed to be manufacturing.

Since the image 40 can support multiple products, the log records are used to track the actual key injection performed at the tester, which will be explain more fully below. By tracking the log records, a producer 16 can attempt to detect if, e.g., a manufacturer 14 returns 50 of product gamma instead of 50 of product alpha (which they have been paid to produce) whereby they could also have sold 50 of product beta on a grey or black market. Such a discrepancy may or may not be malicious but in any case can be reasonably identified.

Figure 4:
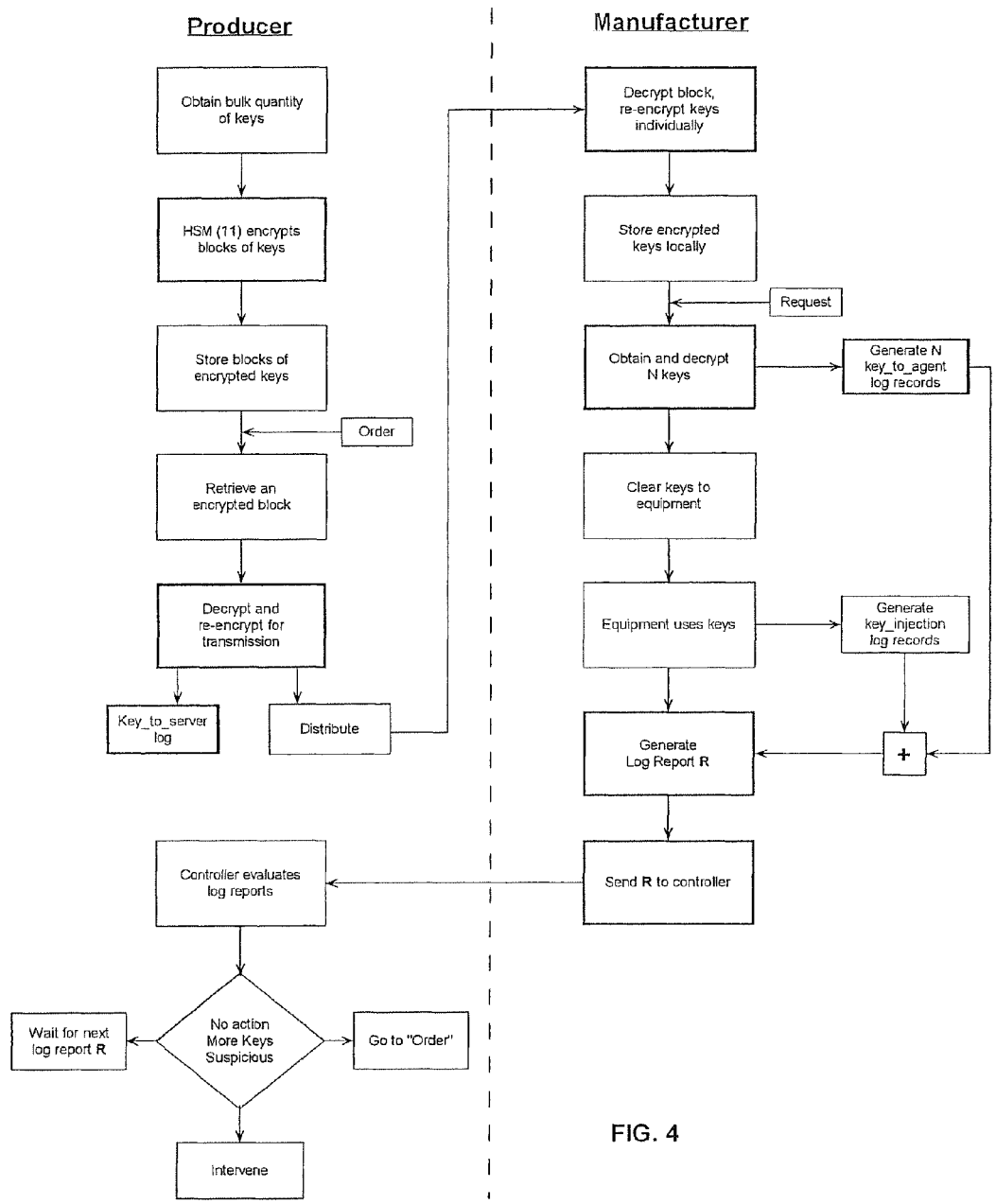
FIG. 4 is a flow chart illustrating a key injection and reporting procedure.

A typical life cycle of a key from its distribution over distribution channel 25 until the HSM 28 reports to the controller 16 over back channel 24, is shown in FIG. 4. The highlighted blocks in FIG. 4 represent those steps performed by secure modules, namely the HSM 11 and the HSM 28. The controller 16 first obtains a bulk quantity of standard keys from an outside supplier. The controller 16 then passes the keys to the HSM 11, and the HSM 11 encrypts blocks of keys, each block containing a measured quantity of a certain keytype. It will be appreciated that the keys may also be bulk encrypted into blocks having more than one key type. The controller 16 then stores the bulk encrypted keys in the storage device 15 until it receives an order or other command indicating that a block of keys is to be distributed.

When the producer 16 distributes a block of keys, it first obtains a bulk encrypted block and passes this block to the HSM 11. The HSM 11 decrypts the block and re-encrypts the block of keys for transmission with the image key 42. The image key 42 is then itself encrypted for each server 18 to producer the individual headers 48. These headers 48 are stored in the group 44 of the main header 46. At this point, the HSM 11 generates a key to server log 402 for the keys that have been re-encrypted for distribution. The log 402 is stored locally at the producer 12 for later analysis. The re-encrypted block of keys is then distributed over the distribution channel 25 to the server 18.

The server 18 passes the encrypted block of keys that are included in the image 40 to the HSM 28, and the HSM 28 then decrypts the image 40. The HSM 28 first selects its particular header 48 from the group 44 and decrypts the image key 42. The image key 42 is then decrypted to obtain the keys from the image 40. The image 40 is then preferably validated, e.g., using a secure hashing algorithm, MAC, or digital signature, and filtered. The HSM 28 also then re-encrypts each key that is obtained from the image 40 for storage. The server 18 then stores the re-encrypted keys locally for later use by the equipment 20. It will be appreciated that authenticity of the images 40 is assumed based on the unique symmetric distribution keys $k_{s1}$ and $k_{s2}$ shared between the controller 16 and server 18. The messages shared therebetween, can be considered authentic once a successful integrity check is performed, e.g. after a sha-2 digest compare.

When the controller 16 receives a request from the equipment 20 for a certain number of keys (e.g. N keys), the HSM 28 is given N keys to decrypt. A key to agent log record 404 is then generated for each of the N keys that is decrypted by the HSM 28 and the keys are passed to the equipment 20 for injection. At this point, the keys are "in the clear" and are thus ready for injection.

The equipment 20 injects each of the N keys and the key agent 21 generates a key injection log record 406 for each key that is injected. The HSM 28 will continually obtain the key to agent log records 404 and key injection log records 406 and preferably concatenates these records into a master log report R that is sent back to the controller 16 over the back channel 24.

The individual logs are preferably concatenated into a binary file, that identifies the date that the file was produced. The reports R are preferably encrypted by the HSM 28 with encryption key $k_1$ and returned to an application running on the server 18 to be sent over the back channel 24. The controller 16 may then decrypt the report R and validate the individual logs (e.g. 402, 404, 406). Each log may be tagged with a monotonically synchronous number. If all the record ID values, put together, are not a contiguous set, then the operator of the controller 16 will know where to track the missing logs in the sequence.

As explained above, the controller 16 had previously stored a number of key to server log records 402 for the N keys when they were distributed. Therefore, the controller 16 expects at some time in the future to receive the report R that completes the lifecycle for each key to indicate that the keys that were originally distributed have been decrypted and injected into the correct device, by the correct server 18. The controller 16 is thus able to evaluate log reports as they are provided. The controller 16 can then determine if any action should be taken, such as intervening in the manufacturing operation (e.g. stop distribution), or providing more keys. The controller 16 may also require further information before distributing a further block of keys. In this way, the controller 16 can meter the distribution and only provide more keys if the manufacturer is operating in good faith and has consistently provided accurate log reports.

The log records (e.g. those shown in FIG. 8) enable a producer to spot discontinuities in the sequence of ID numbers. For instance, if a number of keys have been distributed but have not reported a key to agent or key to injection log, the manufacturer may have lost that key. This could indicate grey or black market activity. In another scenario, the report R may include a key to agent log 404 but not a key injection log 406 for a particular key. This may indicate that the problem originated at the particular equipment requesting the key rather than the manufacturer 14 itself. Therefore, the manufacturer 14 may also use the log reports R for auditing purposes and to identify internal malicious activity so as to maintain its relationship with the producer 12. The life cycle of each key requires a report record at each critical stage where the key is operated on. Therefore, the producer 12 has the necessary information to identify where problems have arisen and to direct efforts towards correcting or eliminating such problems. Preferably, the log records include information pertaining to not only a sequence number for the key, but also the key type. In this manner, the producer 12 can also determine if alpha products were commissioned, yet gamma and beta products may have been produced.

The log reports provide the information to both deter malicious or unethical acts by the manufacturer 14 and provide the means to evaluate the integrity of the existing manufacturers 14 and tools to provide evidence of any undesirable activity. The use of tangible evidence in detecting undesirable activity allows the producer 12 to confront the manufacturer 14 with something more than a suspicion, which, in a case where the illicit activity is occurring at the tester level (e.g. by an employee and not the company itself), may salvage an important relationship between the producer 12 and the manufacturer 14.

Figure 6:
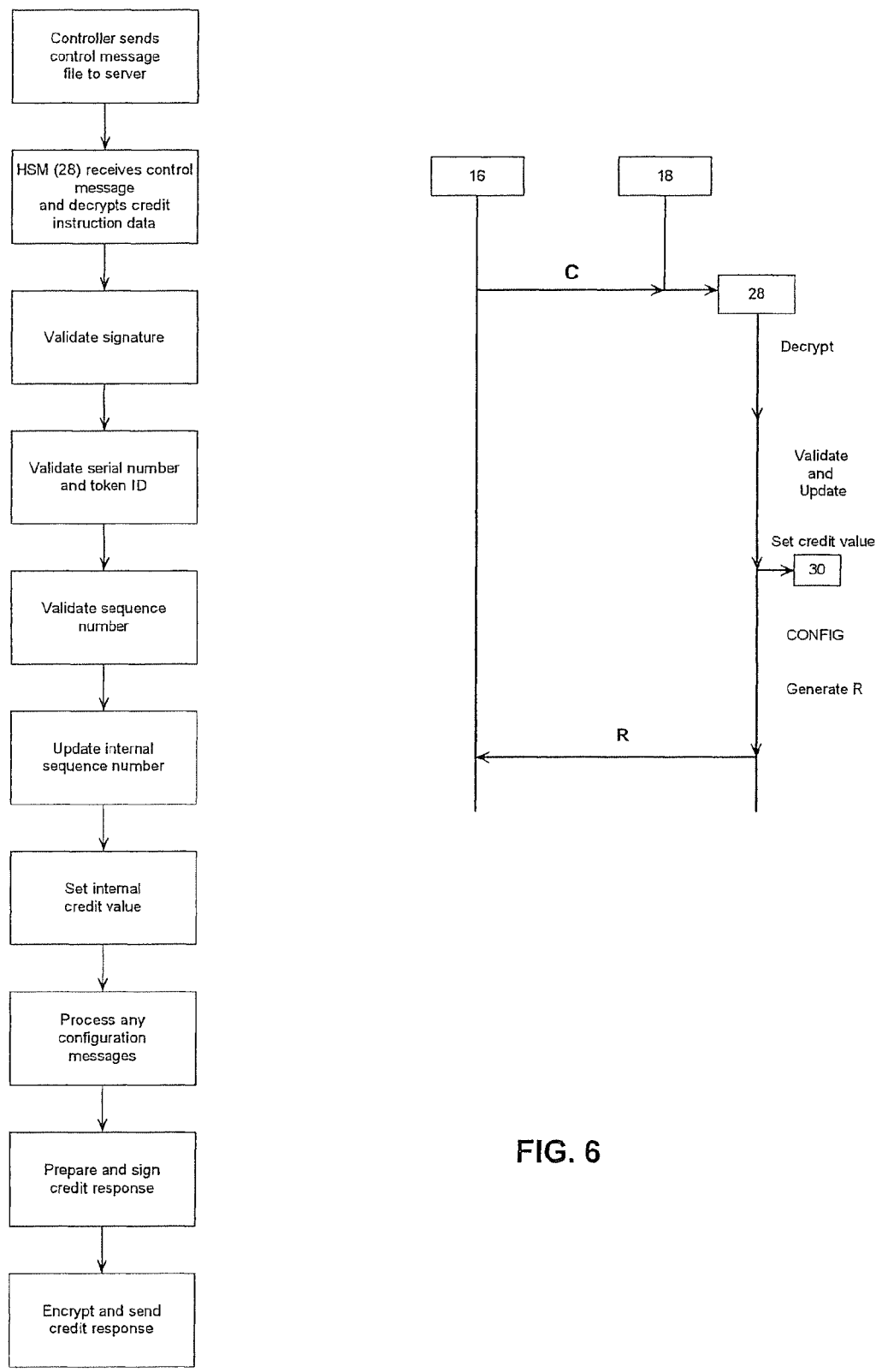
FIG. 6 is a flow chart depicting a credit instruction procedure.

In addition to distribution, the controller 16 uses the control channel 26 to control the credit pool 30 and thus meter the key injection stage. A credit instruction procedure is shown in FIG. 6. The HSM 28 must consume credit from the credit pool 30 when decrypting a distribution image 40 and obtaining keys. Over time, the credit pool 30 will diminish and need to be replenished with a credit instruction file sent by the controller 16.

The controller 16 only sends one control message C to the server 18 at a time over control channel 26. One of the preferably required files contained in this message is a credit instruction file. The file can be an encrypted set of data for a specific server 18 that is decrypted by the HSM 28, to a credit instruction. The credit instruction contains, e.g., the serial number of the HSM 28 and/or server 18, the server's token ID, a sequence number, new credit amount, and configuration data, that has all been signed by the controller 16.

Upon receiving the control message C, the HSM 28 decrypts the credit instruction data from the control message C, and validates the signature. The HSM 28 also validates the serial number and token ID as its own, if applicable. A validation of the sequence number is then performed. The sequence number should be greater than the sequence internally stored in the HSM 28. Once validated, the HSM 28 will update its internal sequence number and set the value of the credit pool 30 to the credit value in the credit instruction.

The HSM 28 will then process any configuration messages in the control message C to update its internal configuration, in order to enable the controller 16 to push configuration data to the server 18, such as updates for filtering rules, keying information, credit rules etc., as explained above in relation to the GUI 13. Configuration data can be intended for the HSM 28, an application running on the server 18 or even the key agent 21. The HSM 28 looks for configuration messages of a defined type to process them. Configuration messages can be marked as private or public, and access thereto would then be controlled by the HSM 28.

A credit report Cr is the server's response to processing a credit instruction in a control message C. The credit report Cr may contain the serial number and token ID of the HSM 28, the current sequence value, the current value of the credit pool 30, number of refills to date, and an error code that is set to zero if no en-ors occurred during credit instruction processing.

The credit report Cr is preferably signed by the HSM 28 using its signing key $k_2$. The report Cr is then encrypted for the controller 16 using the controller's public encryption key $k_3$. The report Cr is then sent to the controller 16 and stored with the log reports R for the above described auditing purposes.

Figure 5:
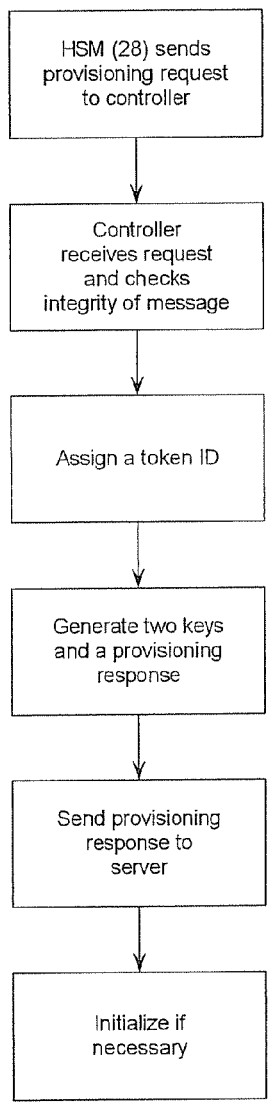
FIG. 5 is a flow chart illustrating a provisioning procedure.
Figure 5:
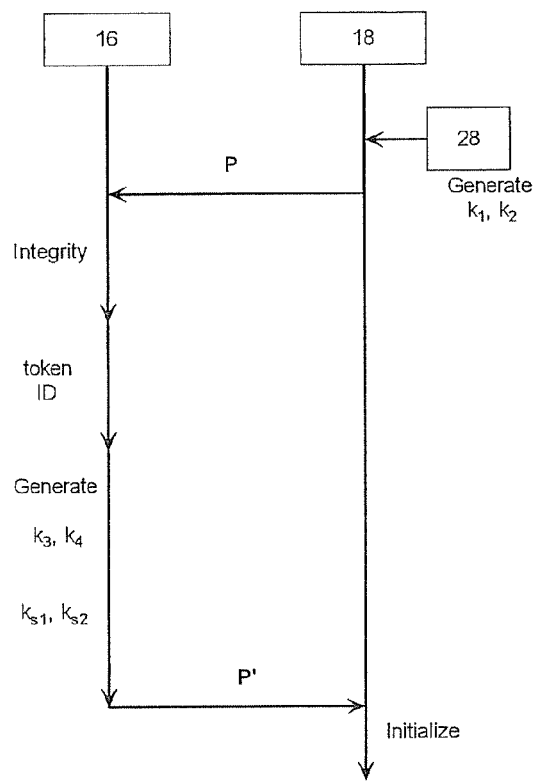

Prior to distributing keys, the producer 12 and the manufacturer 14 may undergo a provisioning procedure to initialize the HSMs and the server 18. The provisioning procedure is shown in FIG. 5. The HSM 28 produces and sends a provisioning request message P to the controller 16. This message P preferably contains the serial number of the HSM 28 being used by the server 18. The HSM 28 generates the two cryptographic key pairs $k_1$, $k_2$ (e.g. RSA key pairs or preferably using elliptic curve cryptography (ECC)), one ($k_1$) for receiving encrypted messages and another ($k_2$) for signing outgoing messages. Preferably, the manufacturer 14 is cryptographically bootstrapped in a physically controlled environment during this exchange of key pairs $k_1$ and $k_2$.

When the controller 16 receives the provisioning request from the server 18, it passes the request to the HSM 11 who checks the integrity of the message and then assigns the manufacturer 14 a "token ID". Two keys, preferably symmetric keys $k_{s1}$ and $k_{s2}$ (e.g. Advanced Encryption Standard (AES) keys), are generated. These keys are to be used by the controller 16 and server 18 to protect the distribution images 40 on the distribution channel 25 and the log reports R on the backward channel 24 as mentioned above.

The HSM 11 then generates a provisioning response message P' that, for example, contains the assigned token ID, public keys of the HSM's encryption and signing key pairs $k_3$ and $k_4$ respectively, the distribution and backward channel symmetric keys $k_{s1}$ and $k_{s2}$, some initial configuration data, and a hash digest for integrity. Similar to the provisioning request message P, it is assumed that the provisioning response message P' is handled within a physically controlled environment (e.g. using HSM protection).

The provisioning response message P' may then be sent to the server 18, and the server 18 may then perform initialization operations upon receiving its first provisioning request. The structure of the provisioning response may contain a member that decrypts to a separate structure that contains symmetric keys for the forward and backward channel communications between the controller 16 and server 18. It shall be noted that these keys are distinct for each HSM 28 (and thus each server 18), and are not shared amongst a group of FISMs. Once the provisioning procedure is complete, a normal exchange of distribution images 40 and control messages C may commence.

Figure 9:
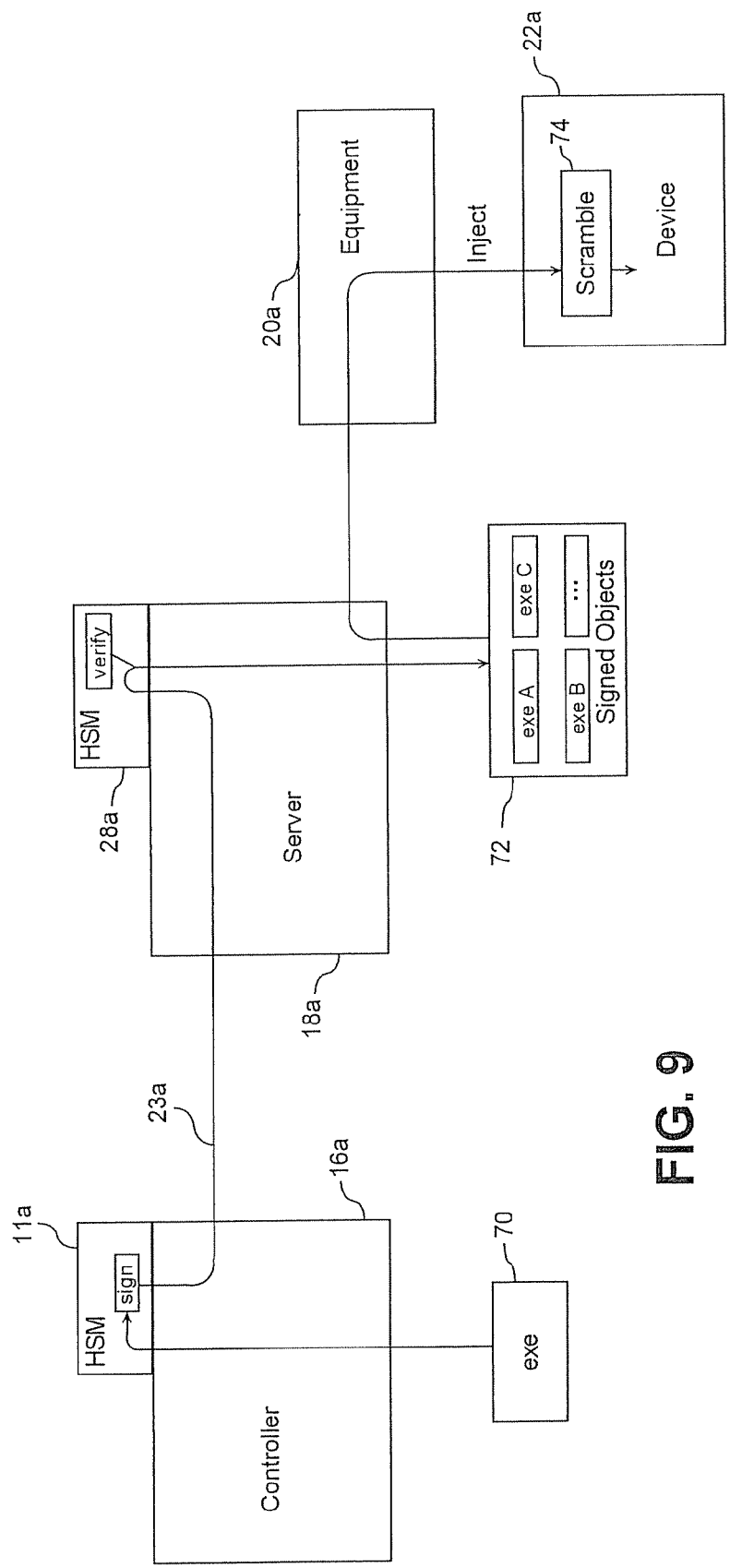
FIG. 9 is a block diagram illustrating another embodiment of a remote device registration system.

In another embodiment, shown in FIG. 9, the system 10 may be retrofitted to existing solutions that have been implemented by the manufacturer 14 for protecting the key injection stage. In the embodiment shown in FIG. 9, like elements are given like numerals with the suffix "a". For example, a manufacturer 14, may have equipment 20*a* that already includes a scrambler 74 for converting a string "BCA" to "ABC", where the device 22 is wired to accept ABC as the injected key. In this manner, if the key "BCA" is stolen or misplaced, it will not work for the device 22*a* because the scrambling has not occurred. These attempts at protecting a key, although easy to implement, are typically naive and may not provide a suitable level of protection. By accommodating for such protection, the system 10 may then be retrofitted to the equipment 20*a* without undoing an existing solution that has already been implemented. Accordingly, additional cost to manufacturer 14 for implementing system 10 can be avoided. The retrofit may be implemented until a complete redesign is warranted, at which time the arrangement shown in FIG. 1 may be used.

In order to accommodate existing solutions, the system 10 stores a set of signed objects 72 at the server 18, which are a collection of executable files that are associated with particular equipment 20*a* and perform the existing solution subsequent to the HSM 28*a* releasing a key, and prior to key injection. In this way, the key is altered to accommodate the existing solution without the equipment 20*a* being aware. As shown in FIG. 9, the controller 16*a* would first need access to the executable file (exe) 70 that is used by the equipment 20*a* to provide the existing solution. The controller 16*a* would then pass the exe 70 to the HSM 11*a*. The HSM 11*a* would then sign the exe 70 and pass the signed exe 70 to the HSM 28*a*, and the HSM 28*a* may then store the signed exe 70 as a signed object 72. In operation, when the equipment 20*a* requests a new batch of keys, the server 18*a* will validate the exe against the exe's signature, that is stored in the HSM 28*a*. Once the server 18*a* has verified the exe 72, it will send the exe keys to be scrambled.

For example, equipment 20*a* requires a key BCA to feed to scrambler 76 in device 22*a* so that the key ABC is injected to product alpha. The HSM 28*a* determines that product alpha has a signed object exe A, for modifying key ABC. The signed object exe A is verified, and applied to key ABC resulting in scrambled key BCA. The scrambled key BCA is then sent to equipment 20*a*, and the scrambler 76 modifies key BCA so that it injects key ABC. The equipment 20*a* does not realize that the key BCA (that it received) was stored by the server 18*a* in a protected form as ABC. It will be appreciated that the key stored by the server 18*a* may also be in a form such as CAB, which is then modified to read BCA for scrambling to then be converted to ABC for injection. Such a case may arise when key CAB is the standard form and must be modified to suit an existing solution where CAB would not be accepted as the key. Therefore, the signed objects 72 will contain any program required to accommodate the existing solution implemented by equipment 20*a*, and the example provided above is solely for illustrative purposes.

The signed objects 72 also inhibit malicious code from being loaded into the server 18*a* for modifying the keys prior to injection, since the signed executables are typically verified for the keys to be released to the machine prior to being applied to a key. The system 10 can thus provide an increased level of security whilst accommodating an existing solution.

Therefore, by utilizing a remote system controller 16 separate from the server 18, the producer 12 is able to monitor the activities of the manufacturer 14, and meter credit through the HSM 28. The producer 16 is thus able to govern the injection of keying information on the devices 22, in order to ensure that the manufacturer 14 correctly reports the identities and the number of units manufactured for the producer 12. This enables the producer 12 to have assurances that a manufacturer 14 is not creating and distributing grey or black market products or devices 22.

With the above procedures and system 10 in place, a producer 12 can monitor production at a manufacturer 14. The producer 12, using the credit instructions in the control messages C, can meter the production of devices 22 by adding or removing available credit for use by the manufacturer 14.

It will be appreciated that the system 10 is not limited to one manufacturer 14 as shown in FIG. 1, nor is each manufacturer 14 limited to one set of equipment 20. The system 10 is also not to be limited to the use of a single controller 16. The HSM 28 is most preferably trusted hardware in order to protect key values and the integrity of the credit pool 30. Moreover, keying information contained in the distribution image 40 does not necessarily have to be keying information, but can also be any data element that requires confidentiality and authenticity. A requirement for keying data is typical of a system 10 which wishes to enforce granularity of device activation.

In an alternative arrangement, exemplified in FIGS. 10-14 and described in greater detail below, overproduction may be inhibited by introducing a separation of duties within the silicon or device manufacturing process. Typically a producer 12 will contract out the various stages of manufacturing to multiple contractors. In general, separation of duties involves purposefully separating manufacturing stages, for silicon chips or other devices, so that the end product must have been "touched", by each subcontractor, in order for the end product to be fully functional. Since grey markets are typically supplied by a single point of failure, or a single bad-faith contractor in the manufacturing chain, forcing a set of contractors to operate in sequence implies that two or more subcontractors must collude against the producer 12, in order to supply a grey market with non-crippled sub-components or devices. The end product, and it's sub-components, should complete all manufacturing stages to be fully functional. In general, the risk of attack against the producer 12 is drastically reduced when multiple sub-contractors are required to collude in order to steal.

In the production of silicon wafers, several stages typically occur, that are often divided amongst several third party manufacturers. A producer 12 that designs a chip, will create the design in a data file or multiple data files, often referred to as a "net list". The net list contains description language in the form of computer code for instructing a third party how to produce a mask for in turn producing a wafer of silicon, from which an IC is packaged and distributed.

For example, in an illustrative manufacturing process, the mask may be sent by the producer 12 to a silicon fabricator who manufactures the silicon wafers from the masks. The wafers may then be sent to a wafer testing facility where individual chips are tested directly on the wafer, and electronically marked so that, when cut, only the individual chips that passed will be forwarded to the packaging facility. The packaging facility will bond and package the silicon into a chip package, and again test the final packaged chip. The finished chips are then typically sent to an OEM, where the chips are mounted on a printed circuit board, which is part of a finished device product, and the finished device product is sent to the distribution channel, and eventually a customer.

The above illustrative manufacturing process generally comprises multiple stages that occur between design and integration of silicon chips into devices, namely fabrication, testing, packaging and installation. It will be appreciated that all of these stages may alternatively occur at a single facility and that there may also be many more stages, up to an arbitrary N number of stages. At each of these stages, there exists an opportunity for overproduction or yield shrinkage to occur.

Figure 10:
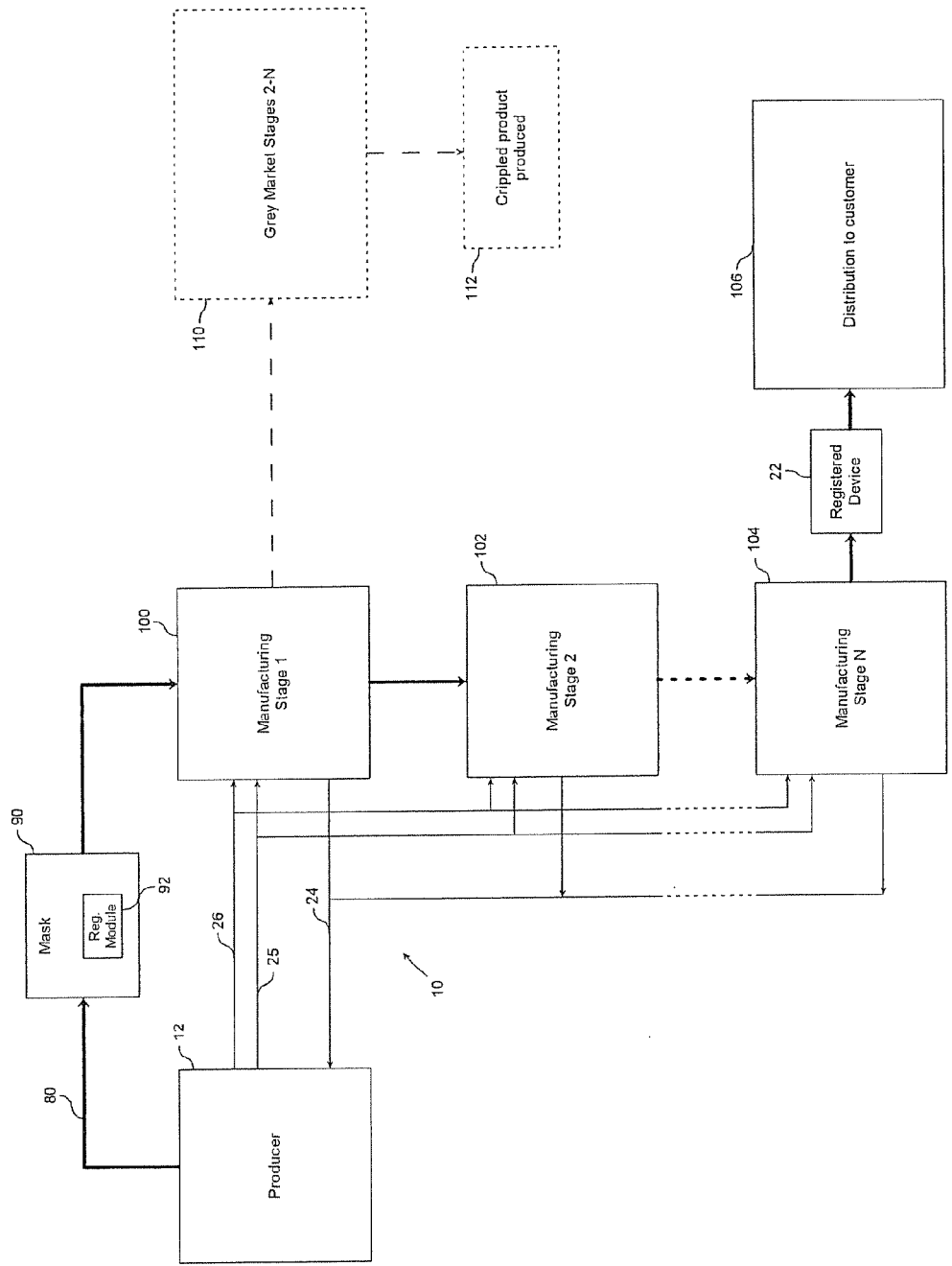
FIG. 10 is a schematic block diagram of an embodiment for key injection using multiple stages in a manufacturing process.

Referring now to FIG. 10, the producer 12 designs a mask 90. The mask 90 is used for producing a registered device 22, in this example, an IC. The device 22 includes some form of sensitive or immutable information that is to be included in its design, and preferably cannot operate without such sensitive information. The producer 12 contracts, in this example, two or more third party manufacturing entities that perform specific stages in the overall manufacture of device 22. FIG. 10 shows a first manufacturing stage 100, a second manufacturing stage 102, up to an arbitrary Nth manufacturing stage 104.

The producer 12 distributes the mask 90 over a product distribution channel 80. The mask 90 is sent to the first manufacturing stage 100, where a portion of the manufacturing takes place, such as production of a silicon wafer. Once the first stage 100 is complete, the resultant partially finished product is sent to the second manufacturing stage 102, to complete a second portion of the manufacturing, such as testing of the wafers. This is repeated for each stage up to the arbitrary Nth stage, which ultimately ships a completely functional, registered device 22 to a distribution entity 106.

In order to prevent an incomplete product or sub-components from being diverted to a grey market 110 at one of the manufacturing entities 100-104, a "separation of duties" is applied. The separation of duties is a division of manufacturing and data programming duties of each manufacturing stage, such that all duties must be performed by the intended contractor in the intended order, necessary to complete production of an un-crippled device. In this example, a sensitive task such as the injection of cryptographic data is injected in multiple stages, each of which is carried out by a distinct manufacturing entity, during a distinct manufacturing stage. In order to separate the sensitive task(s), the producer 12 incorporates a registration module 92 into the design defined in the mask 90. The module 92 is used such that when the mask 90 is compiled to produce the device 22, a mathematical transformation intercepts critical signals and data flows within the silicon chip, such as a boot signal, and if the mathematical transformation cannot operate, the device 22 is crippled. The mathematical transformation is preferably a cryptographic transformation that makes extensive use of Exclusive-OR (XOR) operations, for performance reasons, however this is not a requirement. In order for the mathematical transformation to operate, it is registered through incremental injections or additions of critical data, such as portions of cryptographic keying data, at each stage of the manufacturing process. In this way, if a wafer produced at the first stage 100, is overproduced and supplied to grey market stages 2 through N 110 as shown in FIG. 10, the product 112 is crippled, typically because it has not received all of the required cryptographic data that is required to properly operate.

Preferably, as shown by way of example in FIG. 10, the key injection system 10 described above in FIGS. 1-9 may be used to distribute, meter and solicit reporting of the key injection stages at each manufacturing step. In this case, even if all entities are in collusion to distribute grey market product, the producer 12 will be able to detect this activity due to incomplete log reports, and if necessary inhibit the distribution of further keying data. It will be appreciated that alternatively, system 10 may be used at any number of stages and need not be used at each or any stage at all. For example, the second stage 102 may utilize the system 10 but not any other stage. However, since preferably each manufacturing stage will include some form of testing procedure, it is beneficial to incorporate system 10 into such testing. The producer 12 in this scenario would at least expect data during the second stage. It will also be appreciated that the module 92 may be used without relying on the system 10 and may rely on each manufacturing stage to implement a portion of the keying process. In any of these situations, by splitting responsibilities, no one entity has the necessary information, on their own, to successfully supply grey markets with product or sub-components.

Figure 11:
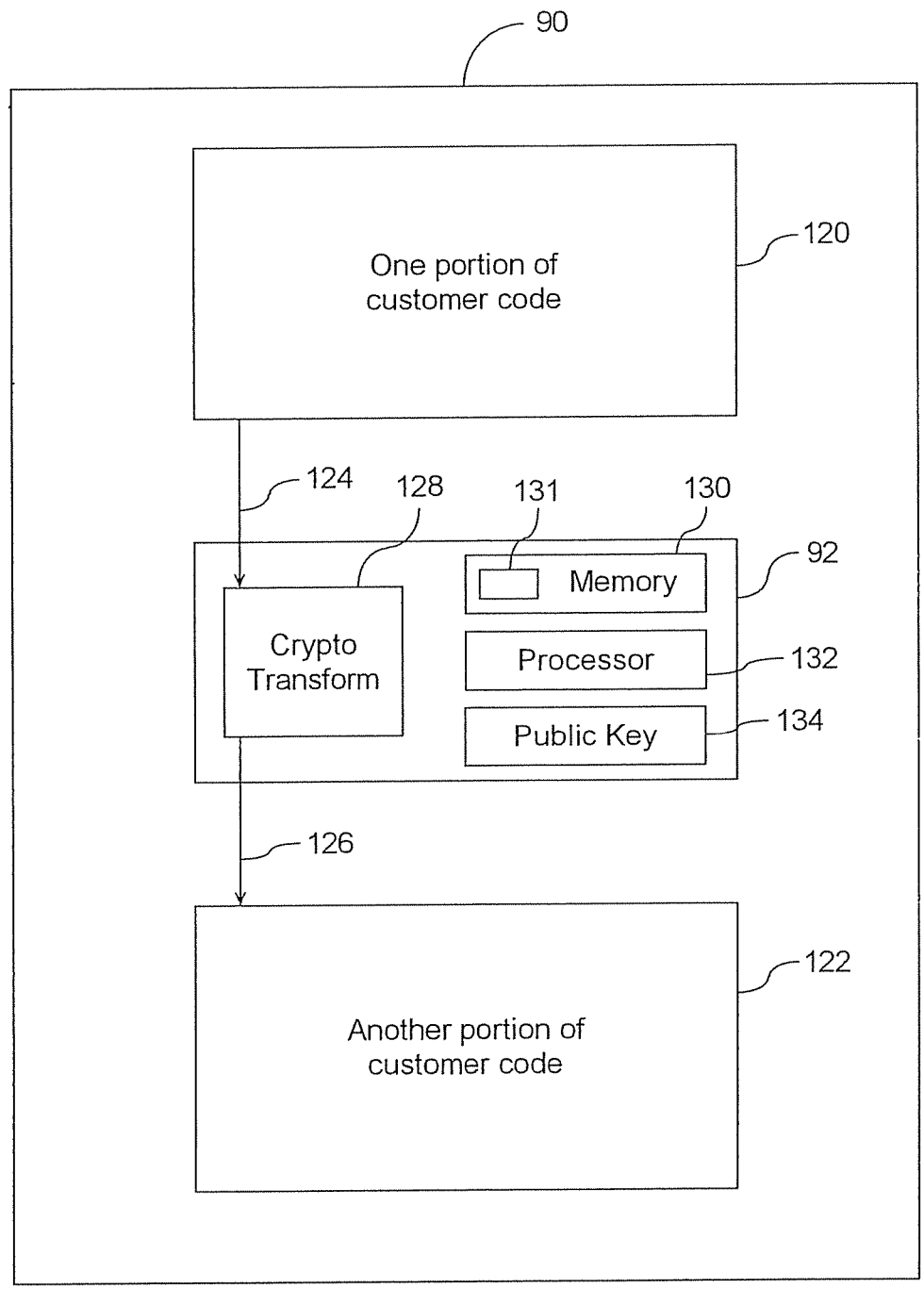
FIG. 11 is a schematic representation of a mask incorporating a registration module for separating key injection stages using the embodiment of FIG. 10.

The mask 90 is shown in greater detail in FIG. 11. As discussed above, the registration module 92 may be incorporated into any mask design, and the mask 90 is then programmed to implement a set of instructions or lines of code etc., that will, in part, insert the contents defined in module 92 within a path (preferably one that is critical to the device's operation) between one portion of the customer code 120 and another portion of the customer's code 122. Data that enters the module 92 along path 124 is applied to a cryptographic transform 128 and is output to the portion 122 along path 126. The output present at path 126 will preferably only be usable if the cryptographic transform 128 is successfully applied to the data input at path 124. The cryptographic transform 128 preferably works with a memory 130, processor 132 and cryptographic key 134 in order to perform its operation. The memory 130, processor 132 and cryptographic key 134 are configured, preferably using the key injection systems 10 present at each manufacturing stage. The memory 130 also includes another cryptographic key 131, which, in general, comprises keying material that is accumulated at each stage, preferably through injection using a key injection system 10 as shown in FIG. 10. Preferably, the key 134 is used at injection time to ensure that the material being accumulated in memory 130 to compose the key 131 is authentic. The key 134 may be a public key, and may or may not be needed. For example, the module 92 may work without the key 134, at the potential risk of some classes of attack that may or may not be relevant to the particular producer 12.

In general, the sensitive data used by module 92 is split into portions, each portion being added to key 131 at each stage of the manufacturing process. For example, one technique would be to inject digital signatures with message recovery at each stage in the manufacturing process. The key 134 may be used to validate the digital signature, in doing so; the validated digital signature produces a message that could be used in a key derivation scheme, with existing data in memory 130, to derive a cryptographic key 131. Another example, would be to employ a key shadowing technique, where pieces of the cryptographic key 131 are added to memory 130 at various manufacturing stages. When the final manufacturing stage has been completed, the memory 130 contains enough data, so that the key shadow technique can be used to re-compose the cryptographic key 131.

Figure 12:
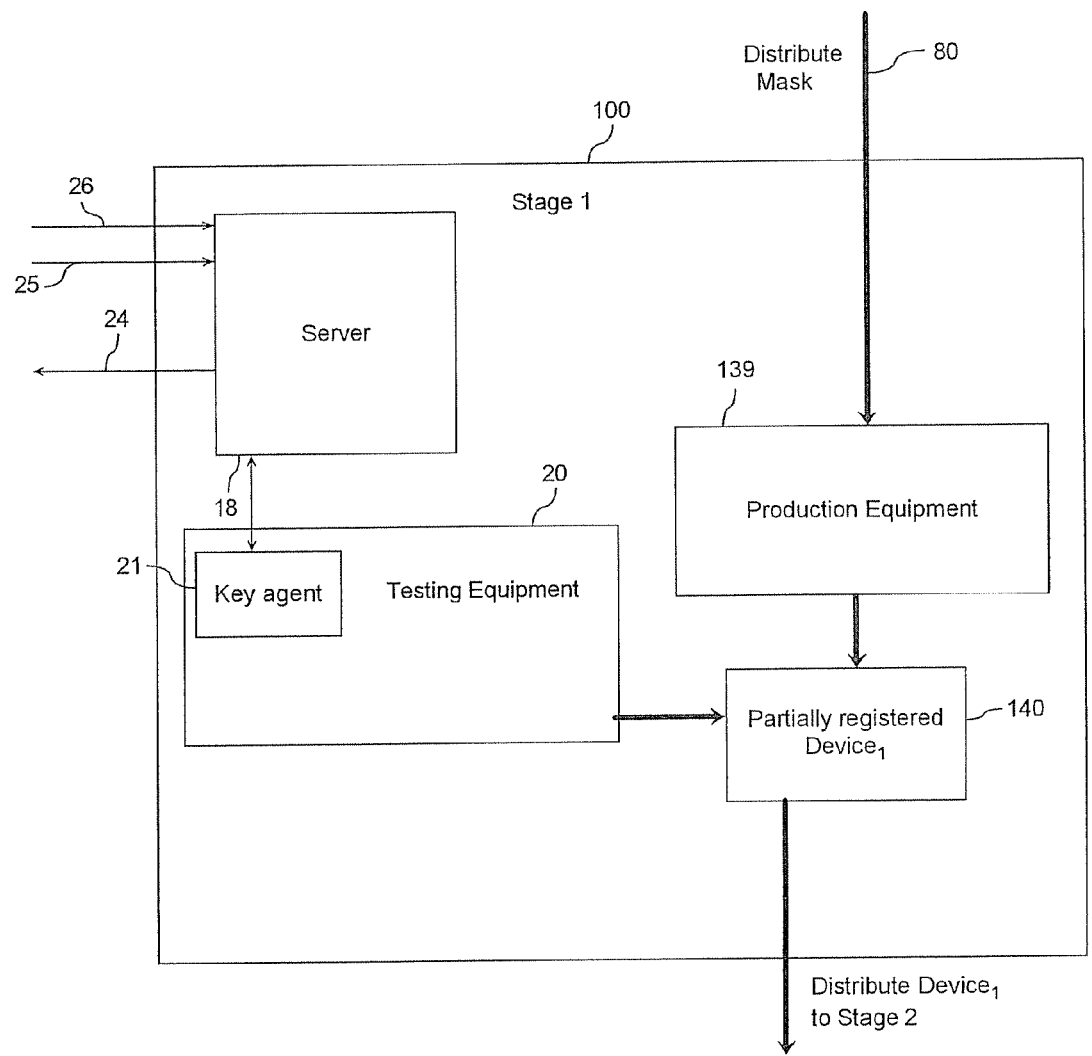
FIG. 12 is a schematic representation of a stage shown in the embodiment of FIG. 10.

An example of the first manufacturing stage 100 is schematically shown in FIG. 12. As noted above, the producer 12 preferably utilizes system 10 for distributing keying data and for monitoring reports generated when keying occurs. Key injection into a silicon chip typically occurs at wafer test, or during a post packaging test. In this example, stage 100 includes a server 18 and key agent 21 operating with testing equipment 20. The stage 100 also includes production equipment 139 to, e.g., produce a silicon wafer. The production equipment 139 uses the mask 90 distributed over channel 80 to produce a partially manufactured Device$_1$ 140. The subscript 1 in this example is used to represent the first portion of sensitive data that is applied to the device 22, where, preferably, the first portion of the sensitive data is injected using the key agent 21 of equipment 20. Preferably at this point, the Device$_1$ is not yet fully operational, for the reason that the transform 128 does not have all the necessary information to perform its operation. The Device$_1$ is then available to be distributed to the second manufacturing stage 102.

Figure 13:
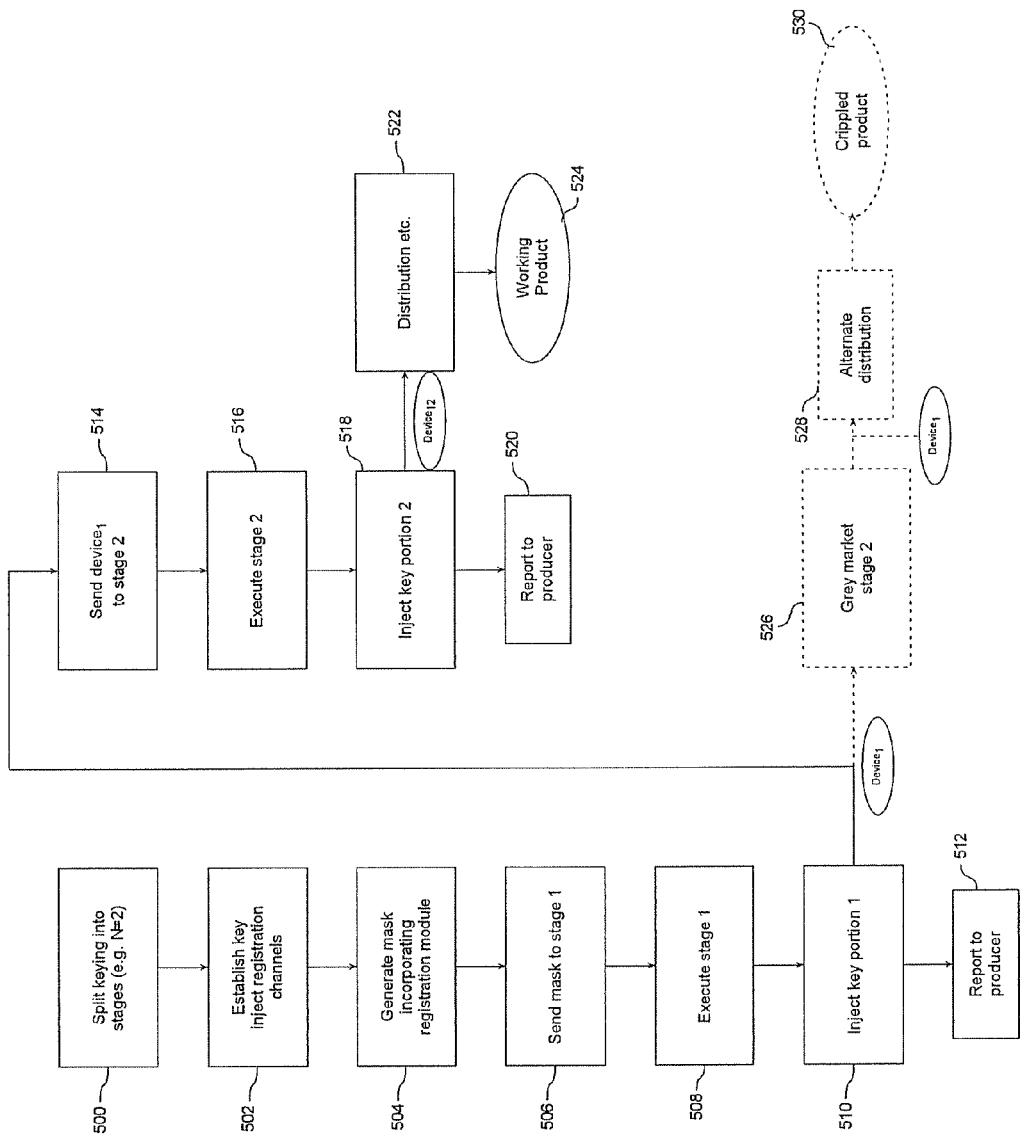
FIG. 13 is a flowchart showing steps taken in producing a device using the embodiment of FIG. 10.

FIG. 13 provides a flow chart showing an example manufacturing process that includes two distinct manufacturing stages (i.e. N=2). At step 500, the producer 12 determines the number of stages, and thus the number of portions of keying data that will be injected, in this example, N=2. At step 502, the producer 12 preferably establishes a key injection system 10 that links each manufacturing stage to itself over the channels 24, 25, and 26. As discussed above with reference to FIG. 1, the producer 12 may use a single controller 16 to communicate with multiple servers 18. In this example, the producer 12 would distribute, monitor and receive log records from two servers 18.

At step 504, the producer 12 incorporates a registration module 92 into its design, defined in the mask 90. The mask 90 is then distributed to the first manufacturer 100 for implementing stage 1 of the manufacturing process at step 506, and stage 1 is executed at step 508. For example, the first manufacturer will produce a wafer, creating chips that conform to the mask 90. During wafer test, the manufacturer will then program some partial keying material into memory 130. This portion of the sensitive data is inserted at step 510, and the sever 18 would preferably report to the producer at step 512 using the mechanisms outlined above. Alternatively, stage 1 may not handle the injection of any sensitive data, and this operation may then be solely executed during stage 2.

Once the first portion of the keying data is programmed to the chip or device, the product contains only partial keying information, not sufficient to operate properly. FIG. 13 is represented by Device', wherein the subscript 1 represents the first portion as described above. The partially produced, partially programmed Device$_1$ is then distributed to stage 2 at step 514, for execution at step 516. The manufacturer 102, at step 518 will then inject a second portion of key data. For example, at step 518, the second manufacturer 102 may program additional keying information, or may derive cryptographic keying information using partial key data stored in memory 130 during step 510 and new key data from the system 10 used at step 518. This derivation step could be based on a hash, or possibly a more sophisticated key shadowing technique. Preferably, at step 520, the second manufacturer 102 reports back to the producer 12, indicating that the second key portion was successfully injected. The producer 12 may now possess two log records indicating that the key data has been successfully inserted, and can use this information to monitor its records.

Once the second portion of the keying data is inserted, the device 22, in this example, is completely produced, and completely registered (e.g. tested and packaged IC), and in FIG. 13 is represented by Device$_{12}$, wherein the subscript 12 represents the complete set of key data, namely data portion 1 and data portion 2. The Device$_{12}$ then continues to a distribution channel at step 522 where it eventually arrives at the customer as a working product at step 524.

As also illustrated in FIG. 13, if, for example, the first manufacturer 100, or an employee thereof, attempts to distribute grey market product at step 526, through an alternate distribution channel at step 528, a crippled product would be provided to the customer at step 530, since the Device$_1$ only contains the first portion of the key data, and thus the transform 128 cannot perform its operation. Therefore, although the testing, packaging etc. may be performed at grey market stage 2, the additional keying data is not provided, and thus the product 530 is fully manufactured, but not completely registered, rendering it crippled. It will be appreciated that the module 92 is preferably implemented such that anti-tampering means are considered and implemented.

Figure 14:
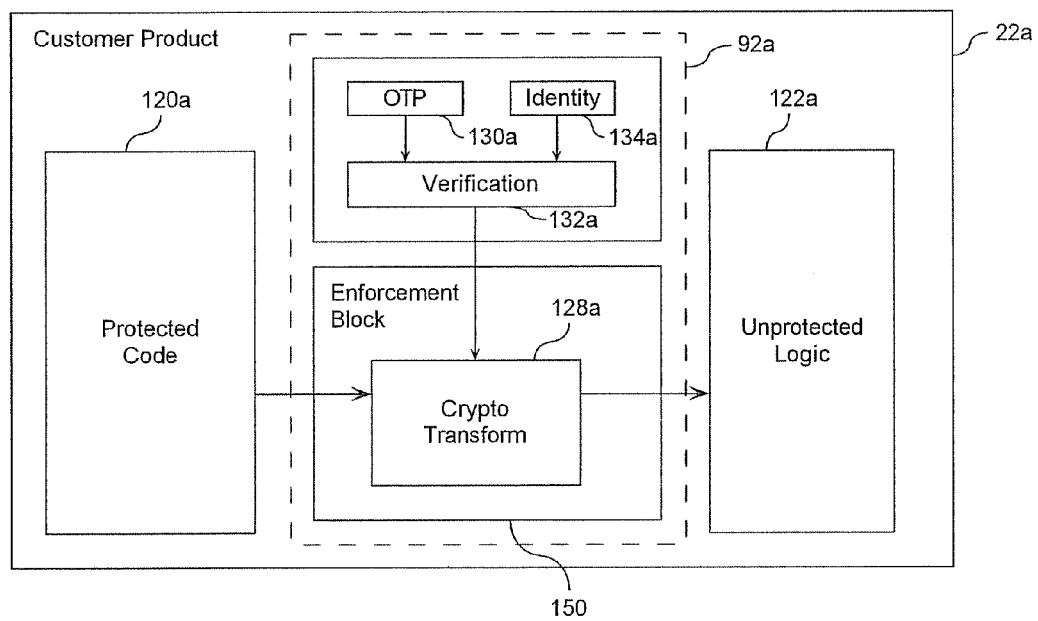
FIG. 14 is a schematic block diagram of an example product produced from the mask shown in FIG. 11.

Referring now to FIG. 14, a schematic example of a finished customer product 22a, incorporating a module 92a is shown, wherein module 92a is a logical manifestation of the physical layout for module 92 shown in FIG. 11. In FIG. 14, like numerals may be given the suffix "a" for clarity. The product 22a, using the implementation of module 92 (e.g. 92a) is able to apply the cryptographic transform 128a, being part of an enforcement block 150, to the product's critical data path between code 120a and 122a. The path is decoded through the transform 128a so that the customer's logic 122a can properly function. In this example, a verification 132a, which is an implementation of processor 132, is performed. The verification 132a uses a one-time programmable (OTP) memory 130a and an identity portion 134a, which is an implementation of the key 134 of FIG. 11. The key 134a and memory 130a are injected with sensitive data using, e.g. the procedure outlined in FIG. 13. It will be appreciated that the product 22a is only one implementation incorporating the logic provided by module 92 (e.g. as module 92a), and that the example shown in FIG. 14 is for illustrative purposes only.

Although the above has been described with reference to certain specific embodiments, various modifications thereof will be apparent to those skilled in the art.

What is claimed is:

1. A method for distributing and monitoring insertion of sensitive data into devices, said method comprising:
    arranging a controller to be communicably connectable to a server being located remote therefrom, said server configured to be communicably connectable to equipment responsible for inserting said sensitive data into said devices, said controller being configured for distributing said sensitive data to said server to enable said server to provide said sensitive data to said equipment, said controller comprising a secure module for performing cryptographic operations;
    said controller using said secure module to cryptographically protect said sensitive data; said controller sending a cryptographically protected data transmission comprising said sensitive data to said server to enable said server to extract said sensitive data therefrom;
    said controller providing a credit value to said server indicative of a number of sensitive data insertions that are permitted before requesting more of said sensitive data from said controller to enable said server to update said credit value according to amounts of said sensitive data provided to said equipment;
    said controller receiving a log report from said server, said log report pertaining to the insertion of an amount of said sensitive data into respective devices by said equipment upon said equipment obtaining said amount of sensitive data from said server upon request, said log report having been generated from at least one log record obtained by said server from said equipment; and
    said controller enabling said log report to be compared to a record generated by said controller indicative of distribution of said sensitive data to said server to monitor said insertion of said sensitive data.

2. The method according to claim 1, further comprising receiving a request from said server for additional sensitive data, and providing said additional sensitive data and a new credit value to said server.

3. The method according to claim 1, wherein said log report further comprises a log record indicative of the distribution of said amount of sensitive data by said server to said equipment.

4. The method according to claim 1 wherein said secure module encrypts a header included in said data transmission to protect a key, said key enabling said server to decrypt said transmission and extract said sensitive data therefrom.

5. The method according to claim 1, further comprising initiating a provisioning procedure executed prior to sending said sensitive data to said server, said provisioning procedure being used to initialize said server and said secure module.

6. The method according to claim 1 comprising sending said data transmission to a plurality of servers.

7. The method according to claim 1 further comprising said controller sending a credit instruction to said server indicating an update for said credit value.

8. The method according to claim 1 further comprising said controller sending to said server, an object for implementing an existing data insertion solution, said existing solution modifying said data; said object having been signed to be provided to a secure module for said server to store said signed object, verify said signed object, and modify said sensitive data according to said existing solution if said signed object is verified.

9. The method according to claim 1 wherein said data transmission includes a plurality of types of sensitive data, said method further comprising said secure module sending certain ones of said types according to permissions established by said controller.

10. The method according to claim 9 wherein said log report includes an indication of which one of said types has been provided by said secure module to said equipment.

11. The method according to claim 1 further comprising said controller sending a configuration message to said server for use in modifying settings in a secure module at said server.

12. The method according to claim 1, wherein said log report is received by said controller in response to a poll initiated by one of said server and said controller.

13. The method according to claim 1, wherein said log report is received by said controller for obtaining additional sensitive data, wherein a further data transmission is sent to said server if comparison of said log report to said record generated by said controller indicative of distribution of said sensitive data to said server is favourable, and additional sensitive data is required; and wherein said controller sends to said server an instruction to inhibit further extraction of said sensitive data from any previous transmission if said comparison is not favourable.

14. The method according to claim 1 wherein said sensitive data comprises a plurality of keys, said data transmission including a quantity of said keys encrypted by said secure module to enable said server to decrypt one or more of said keys as indicated by instructions provided by said controller apriori.

15. The method according to claim 14 wherein said secure module encrypts said quantity of keys to enable said server to individually re-encrypt each key; wherein certain ones of said keys are decrypted for use by said equipment upon a request made by said equipment.

16. The method according to claim 1 wherein said secure module contains a symmetric key for communicating over forward and backward communication channels between said server and said controller.

17. The method according to claim 1, wherein inserting said sensitive data comprises injecting information into said devices.

18. The method according to claim 1, wherein inserting said sensitive data comprises keying said devices.

19. A system for distributing and monitoring insertion of sensitive data into devices, said system comprising:

a controller device communicably connectable to a server being located remote therefrom, said server configured to be communicably connectable to equipment responsible for inserting said sensitive data into said devices, said controller device being configured for distributing said sensitive data to said server to enable said server to provide said sensitive data to said equipment, said controller device comprising a secure module for performing cryptographic operations;

said controller device being configured for:

using said secure module to cryptographically protect said sensitive data;

sending a cryptographically protected data transmission comprising said sensitive data to said server to enable said server to extract said sensitive data therefrom;

providing a credit value to said server indicative of a number of sensitive data insertions that are permitted before requesting more of said sensitive data from said controller device to enable said server to update said credit value according to amounts of said sensitive data provided to said equipment;

receiving a log report from said server, said log report pertaining to the insertion of an amount of said sensitive data into respective devices by said equipment upon said equipment obtaining said amount of sensitive data from said server upon request, said log report having been generated from at least one log record obtained by said server from said equipment; and enabling said log report to be compared to a record generated by said controller indicative of distribution of said sensitive data to said server to monitor said insertion of said sensitive data.

20. The system according to claim 19, wherein said controller device is further configured for receiving a request from said server for additional sensitive data, and providing said additional sensitive data and a new credit value to said server.

21. The system according to claim 19, wherein said log report further comprises a log record indicative of the distribution of said amount of sensitive data by said server to said equipment.

22. The system according to claim 19 wherein said secure module encrypts a header included in said data transmission to protect a key, said key enabling said server to decrypt said transmission and extract said sensitive data therefrom.

23. The system according to claim 19, wherein said controller device is further configured for initiating a provisioning procedure executed prior to sending said sensitive data to said server, said provisioning procedure being used to initialize said server and said secure module.

24. The system according to claim 19, wherein said controller device is further configured for sending said data transmission to a plurality of servers.

25. The system according to claim 19, wherein said controller device is further configured for sending a credit instruction to said server indicating an update for said credit value.

26. The system according to claim 19, wherein said controller device is further configured for sending to said server, an object for implementing an existing data insertion solution, said existing solution modifying said data; said object having been signed to be provided to a secure module for said server to store said signed object, verify said signed object, and modify said sensitive data according to said existing solution if said signed object is verified.

27. The system according to claim 19 wherein said data transmission includes a plurality of types of sensitive data, and wherein said controller device is further configured for sending certain ones of said types according to permissions established by said controller system.

28. The system according to claim 27 wherein said log report includes an indication of which one of said types has been provided by said secure module to said equipment.

29. The system according to claim 19 wherein said controller device is further configured for sending a configuration message to said server for use in modifying settings in a secure module at said server.

30. The system according to claim 19, wherein said log report is received by said controller device in response to a poll initiated by one of said server and said controller.

31. The system according to claim 19, wherein said log report is received by said controller for obtaining additional sensitive data, wherein a further data transmission is sent to said server if comparison of said log report to said record generated by said controller indicative of distribution of said sensitive data to said server is favourable, and additional sensitive data is required; and wherein said controller sends to said server an instruction to inhibit further extraction of said sensitive data from any previous transmission if said comparison is not favourable.

32. The system according to claim 19 wherein said sensitive data comprises a plurality of keys, said data transmission including a quantity of said keys encrypted by said secure module to enable said server to decrypt one or more of said keys as indicated by instructions provided by said controller apriori.

33. The system according to claim 32 wherein said secure module encrypts said quantity of keys to enable said server to individually re-encrypt each key; wherein certain ones of said keys are decrypted for use by said equipment upon a request made by said equipment.

34. The system according to claim 19 wherein said secure module contains a symmetric key for communicating over forward and backward communication channels between said server and said controller.

35. The system according to claim 19, wherein inserting said sensitive data comprises injecting information into said devices.

36. The system according to claim 19, inserting said sensitive data comprises keying said devices.

* * * * *